June 20, 1961  A. O. MAYLOTT ET AL  2,989,450
PREPARATION OF ALKALI METAL HALIDES
Filed Jan. 30, 1958
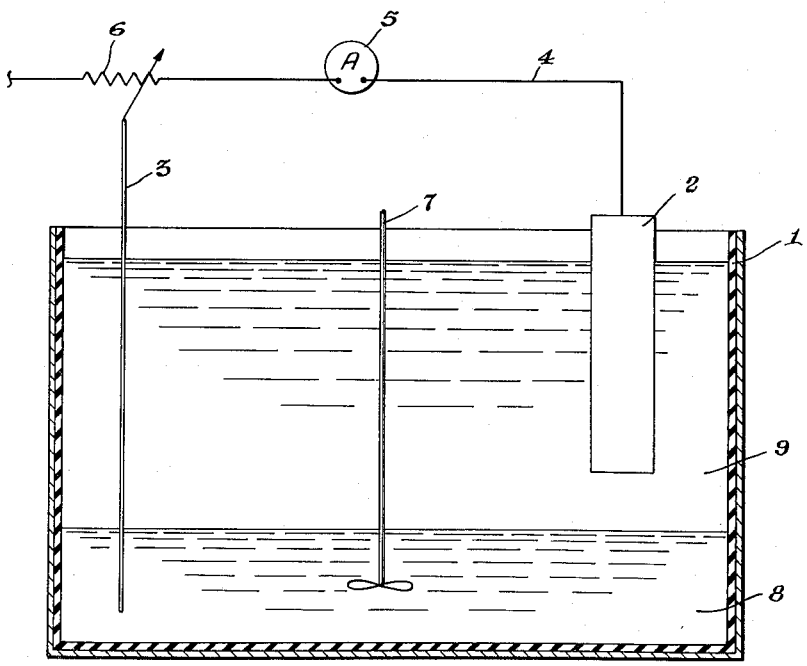
INVENTORS.
Asa O. Maylott
BY Edgar A. Elkins, Jr.
Griswold & Burdick
ATTORNEYS United States Patent Office 2,989,450
Patented June 20, 1961

2,989,450
PREPARATION OF ALKALI METAL HALIDES
Asa O. Maylott, Concord, and Edgar A. Elkins, Jr., Pittsburg, Calif., assignors to The Dow Chemical Company, Midland, Mich., a corporation of Delaware
Filed Jan. 30, 1958, Ser. No. 712,109
12 Claims. (Cl. 204—94)

This invention relates to a process for the preparation of alkali metal halides, and more particularly to the preparation of alkali metal halides by using alkali metal amalgams.

A method most commonly used in the production of alkali metal halides is to react the respective halogen with an alkali metal hydroxide in an aqueous medium. The product obtained by this process always contains the oxyhalogen of the alkali metal, such as the alkali bromate or iodate, as well as the halide. Thus, to obtain the halide the reaction product must be evaporated and the resulting crystalline mixture of the halide and the oxyhalogen fused to convert the oxyhalogen compound to the halide.

In United States Letters Patent No. 2,278,053, a process for the preparation of alkali halides without obtaining an oxyhalogen in the final product is disclosed wherein an aqueous solution of a halogen and a hydroxide is subjected to the galvanic action of activated carbon and iron. In the disclosed process, iron and activated carbon in powder form are mixed with the halogen and hydroxide solution to provide the galvanic action. The agitation of the iron and the carbon with the solution contaminates the product. A portion of the iron is converted to ferrous hydroxide which is soluble and difficult to remove. Small amounts of iron impurities cannot be tolerated in certain uses of alkali metal halides, such as the use of potassium iodide in photographic film production. Further, the process involves numerous steps requiring large equipment for the separation of the carbon and iron from the product, such as filters, aeration tanks, and settlers. Thus, in addition to the large plant area that must be devoted to the process, the cost of pumping the reactants from one piece of equipment to another considerably increases the manufacturing cost of the alkali halides.

It is, therefore, a principal object of this invention to provide a method of preparation of an alkali metal halide from the corresponding halide and alkali metal wherein the oxyhalogen is not obtained in the reaction product and wherein the product is not contaminated with iron. A further object is to provide a process of the foregoing character having relatively few steps wherein large equipment, such as filters, settlers, and aeration tanks is not required.

The above and additional objects are attained, according to the invention, by contacting an aqueous solution of a halogen, having an atomic number in the range of 35 to 54, with an alkali metal containing amalgam. Extensive equipment is not required and the alkali metal halide is obtained without the presence of the alkali oxyhalogen.

The halogen solution when in contact with the alkali metal containing amalgam may be subjected to the electrolysis resulting from the galvanic action between the amalgam and a carbon electrode immersed in the solution. Upon subjecting the solution to the electrolysis resulting from the galvanic action an increase in the rate of reaction of the halogen in the aqueous solution with the alkali metal in the amalgam is obtained. Since a more rapid rate of reaction is obtained with galvanic action, it is generally preferred to carry out the reaction employing galvanic action.

In the attached drawing an apparatus for carrying out one embodiment of the invention is schematically shown wherein an aqueous halogen solution is brought into contact with alkali metal containing amalgam and subjected to the galvanic action which occurs between the amalgam and a carbon electrode therein immersed and electrically connected to the amalgam. The apparatus comprises a lined tank 1, a graphite or carbon electrode 2 extending part way into tank 1, and an electrical conductor 3 likewise extending into tank 1 and disposed at a distance from electrode 2. Electrical conductor 3 and electrode 2 are electrically connected together by conductor 4 through an ammeter 5 and a variable resistor 6. Tank 1 is also provided with stirrer 7. Tank 1 is constructed or lined with a material which is resistant to the halogen solution and alkali metal containing amalgam so that it will not contaminate the product. For example, a glass or rubber lined vessel may be used.

The term "carbon electrode," as used herein, includes electrodes made of graphite as well as those from coke.

In the operation of the cell in the preparation of alkali metal halides, an alkali metal containing amalgam 8, such as a potassium amalgam, and an aqueous solution of a halogen 9, for example, an iodine and potassium iodide solution are placed in the tank 1. The amalgam in the cell is stirred by stirrer 7 and is in contact with conductor 3. Electrode 2 is partially immersed in the halogen-containing solution out of contact with the amalgam as shown. The halogen-containing solution serves as an electrolyte and a galvanic action between the carbon electrode and the amalgam will generate a current which flows through conductor 4, ammeter 5 and resistor 6. By adjusting the resistance of resistor 6, the desired current rate is obtained. The completion of the reaction is generally evidenced by a sharp current drop which occurs generally 10 to 30 minutes after the start of the reaction. After the reaction has been completed, the resulting potassium iodine solution and the mercury or amalgam freed of its alkali metal are removed. The potassium iodide solution from the apparatus may then be concentrated by evaporation and pure alkali metal halide obtained by crystallization.

It is apparent that the invention may be carried out as a continuous process. An apparatus similar to that shown in the drawing may be used wherein the halogen solution and the amalgam are continuously passed through it at a rate such that the alkali metal in the amalgam is liberated and reacted with the halogen to form the alkali metal halide. When the carbon electrode is not used to provide the galvanic action, the same results are obtained except that the reaction time is increased by about 30 percent.

By the process just described above, halides of alkali metals such as sodium, potassium, lithium, rubidium, and other alkali metals, may be thus prepared. Aqueous solutions of halogens, such as bromine and iodine, are contacted with the amalgam containing the desired alkali metal. Halogen solution of any concentration may be used. For halogens which have a relatively low solubility in water, for example bromine and iodine, aqueous solutions of the halogen salts may be used as a solvent instead of water. The aqueous solution of the alkali metal halide being produced is generally the solvent utilized in dissolving the halogen. For example, in the production of potassium iodide, an aqueous potassium iodide solution would be used as a solvent for the iodine. When a solution of the same alkali metal halide is used as a solvent, the final product obtained is the alkali metal halide and no separation of the alkali metal halide produced from the solvent is necessary. Solutions of other salts, such as the oxyhalogen salts, may also be used. When an aqueous solution, such as alkali metal iodate or bromate is employed as solvent, the iodate or bromate is also reduced to the halide and thereby a final product containing only the alkali metal halide is obtained.

Amalgams containing various concentrations of the alkali metal may be used. However, generally amalgams containing alkali metals to the extent that they are no longer fluid are undesirable due to the difficulty of handling the material and in obtaining efficient contact with the halogen solution. Amalgams of sodium and potassium obtained in chlorine electrolytic cells are ideally suited. In this process the removal of the alkali metal from the mercury is so complete that this process may be used as a means of recovery of the alkali metal from the amalgam.

The temperature at which the process is carried out may be widely varied. The temperature affects the fluidity of the amalgam and thus higher temperatures would generally be employed when the amalgam contains a higher concentration of alkali metal. Temperatures in the range from room temperature to boiling point of the aqueous solution may be used, but it is generally preferred to use a temperature in the range of 60° to 100° C.

The amounts of the amalgam and of the halogen solution respectively used is generally such that the weight of the alkali metal in the amalgam is equal to the chemically equivalent weight of the free halogen in the solution as indicated in the following equation illustrating one form of the reaction:

$$I_2 + 2K \rightarrow 2KI$$

If the halogen containing solution is contacted with an amount of amalgam that contains a greater amount of alkali metal than the equivalent amount of free halogen, some alkali metal hydroxide is formed and remains in the solution. Conversely, if an excess of free halogen is present in the solution, all of the halogen will not be reacted. Under certain conditions, it may be desirable to permit a proportion of the hydroxide to be formed in the product solution. Thus, an excess of amalgam would be used. However, if it is desirable to exhaust the alkali metal from the amalgam, an excess of halogen-containing solution may be used and the solution recycled to completely react the free halogen.

When a carbon electrode is employed to provide galvanic action, the current used in the process is relatively immaterial. A resistance, as shown by number 6 in the attached drawing, may be used in the circuit between the carbon electrode and the amalgam to control the current flow or the carbon electrode may be contacted with the amalgam providing the maximum current flow.

The following examples further illustrate the invention but are not to be construed as limiting it thereto.

EXAMPLE I

A small scale apparatus similar to that shown in the attached drawing was used in the preparation of potassium iodide. To the tank were added, 307 grams of potassium amalgam containing 0.2 weight percent of potassium and 29 milliliters of an aqueous solution of potassium iodide containing 50 weight percent of potassium iodide and 4 weight percent iodine in solution. The 29 milliliters of the potassium iodide solution contained 13.4 milliequivalents of iodine and the amalgam 15.4 milliequivalents of potassium. A conductor placed in the tank so that it was in contact with the amalgam was connected through a resistor and an ammeter to a graphite electrode 25 mm. in diameter which was immersed in the aqueous potassium iodide solution containing the dissolved iodine. By use of the resistor, the initial current flow through the graphite electrode and conductor was limited to 0.5 ampere. Upon the addition of the amalgam and the potassium iodide solution containing the iodine, the reaction begins at once indicated by the current flowing through the circuit. The amalgam was agitated by a stirrer to provide a good contact of the amalgam with the aqueous solution containing the iodine. A sharp drop in current was noted upon the completion of the reaction which ended about 16 minutes after placing the reactants in the tank. Two minutes after the sharp drop in current flow was noted the aqueous solution phase in the tank was separated from the resulting amalgam.

Analysis of the amalgam so obtained showed that only 0.07 milliequivalent of potassium remained in it. The aqueous solution was also analyzed and found to contain 2.9 milliequivalents of potassium hydroxide. No free iodine or potassium iodate was present.

To show the effect of the galvanic action on the rate of reaction, the above run was repeated except that the graphite electrode was removed and the reaction was carried out without the galvanic action between the graphite electrode and the amalgam.

To the tank, 301 gm. of the amalgam and 27 milliliters of the aqueous potassium iodide solution containing the free iodine were added. The concentration of the potassium in the amalgam and the concentration of iodine and potassium iodide in the aqueous solution were the same as that used in the previous run. The above amounts of the amalgam and the potassium iodide solution gave 15.1 milliequivalents of potassium and 12.5 milliequivalents of free iodine. Upon the addition of the reactants to the tank, the amalgam was agitated to obtain good contact between the amalgam and the aqueous solution. Samples of the aqueous solution from the reaction tank were periodically removed during the reaction and analyzed for free iodine. No free iodine or potassium iodate were present in the aqueous solution in the reaction tank 24 minutes after the addition of the reactants to the tank.

An analysis of the amalgam in the tank after the reaction showed that it contained 1.56 milliequivalents of potassium. The aqueous phase or aqueous solution contained 1.14 milliequivalents of potassium hydroxide.

EXAMPLE II

To show the effect of the galvanic action between a graphite electrode and the amalgam on the reduction of iodine in an aqueous solution by an amalgam containing potassium, 4 runs were made wherein different current strengths were used. The apparatus used was the same as that used in Example I. In three of the runs of this example, the graphite electrode was used and the runs were carried out in a manner similar to that described in the first part of Example I. An initial current of 0.5 ampere, as indicated by the ammeter, was set for one of the three runs and 1 ampere for another by adjustment of the resistance in the electrode and conductor circuit while the third run was made with the graphite electrode in contact with the amalgam in the tank. The fourth run was made without using the graphite electrode and was carried out in a manner similar to that described in the second part of Example I.

An amalgam containing 0.2 weight percent of potassium and a 20 weight percent potassium iodide aqueous solution containing 3 weight percent of free iodine were used for all of the four runs.

The amalgam and the aqueous solution in the tank after the completion of each of the four runs were analyzed as in Example I. The milliequivalents of potassium in the amalgam and the milliequivalents of free iodine in the potassium iodide solution used as reactants for each of the runs are shown in the table below. The potassium remaining in the amalgam after each run, and the free iodine and the potassium hydroxide content of the aqueous phase after the completion of each run are also shown in the table.

| Milliequivalents of Reactants | | Milliequivalents Remaining After Reaction | | | |
|---|---|---|---|---|---|
| Potassium in Amalgam | Free Iodine in KI Solution | Potassium in Amalgam | Free Iodine in Aqueous Solution | KOH in Aqueous Solution | Current Rate |
| 10.8 | 9.65 | 0 | 0.32 | 0 | .5 amp. |
| 33.7 | 22.2 | 0 | 0 | 10.6 | 1.0 amp. |
| 8.4 | 7.85 | 0 | 0.02 | 0.01 | electrode in contact with amalgam. |
| 8.35 | 7.85 | 0 | 0.86 | 0.63 | no electrode used. |

EXAMPLE III

To show the effect of the reaction temperature on reduction of iodine in an aqueous solution by amalgam containing potassium, two runs were made in a manner similar to that described in the first part of Example I. In one of the runs, the reactants were at 25° C. and as the reaction proceeded the temperature of the reactants gradually increased to about 55° C. In the second run the reactants were initially at 72° C. and the temperature of the reactants increased gradually to about 100° C. as the reaction proceeded.

An amalgam containing 0.2 weight percent of potassium was used in each of the runs. Iodine was dissolved in a 50 weight percent potassium iodide solution until the solution contained 33 weight percent of free iodine and this aqueous solution thus obtained was used for each of the runs.

The amalgam and the aqueous solutions in the tank were analyzed after completion of the runs as in Example I. The milliequivalents of the potassium in the amalgam and of the free iodine in the solution used as reactants and the analysis of the amalgam and the aqueous solution after the reaction is shown in the table below.

| Milliequivalents of Reactants | | Initial Temperature Reactants ° C. | Milliequivalents Remaining After Reaction | | | |
|---|---|---|---|---|---|---|
| Potassium in Amalgam | Free Iodine in KI Solution | | Potassium in Amalgam | Free Iodine in Aqueous Solution | KOH in Aqueous Solution | Current Rate, amps. |
| 28.9 | 27.4 | 25 | 0.38 | 0 | alkaline | 0.5 |
| 27.3 | 26.2 | 72 | 0.45 | 0 | 0 | 1 |

EXAMPLE IV

The apparatus and the method described in first part of Example I were used in the preparation of potassium bromide, sodium iodide, sodium bromide, lithium iodide, and lithium bromide. The pertinent data on the reactants and the analysis of the amalgam and aqueous solution after the completion of the reaction are given in the table below. In the table "milliequivalents" is abbreviated as "meq."

*Reactants*

| Amalgam | | | | Aqueous Halogen Solution | | | | Meq. Remaining After Reaction | | | |
|---|---|---|---|---|---|---|---|---|---|---|---|
| alkali halide produced | alkali metal in amalgam | meq. of alkali metal per gm. of Hg | amount of amalgam used, meq. of alkali metal | halogen used | aqueous solution used as halogen solvent | conc. of halogen in solution, meq. per ml. of solution | amount of halogen reacted, meq. of halogen | alkali metal in amalgam | free iodine in aqueous solution | hydroxide in aqueous solution | initial current, amp. |
| KBr | K | 0.142 | 50.5 | Br₂ | KBr | 0.485 | 48.5 | 6.0 | 1.3 | 0.3 | 2.0 |
| NaI | Na | 0.5 | 52.0 | I₂ | NaI | 0.100 | 43.8 | 7.7 | 0 | 3.9 | 1.0 |
| NaBr | Na | 0.274 | 50.5 | Br₂ | NaBr | 0.442 | 42.2 | ------ | 0.01 | 6.9 | 1.0 |
| LiBr | Li | 0.098 | 30.6 | Br₂ | Li Br | 0.485 | 24.2 | 0.7 | 0 | 7.2 | 2.5 |
| LiI | Li | 0.092 | 46.3 | I₂ | Li I | 0.443 | 33.2 | 9.1 | 0.06 | 5.2 | 2.0 |

What is claimed is:

1. A process for the preparation of an alkali metal halide substantially free of the corresponding alkali metal oxyhalide, which comprises contacting an aqueous solution of a halogen having an atomic number in the range of 35 to 54 with an amalgam containing an alkali metal.

2. A process for the preparation of an alkali metal halide substantially free of the corresponding alkali metal oxyhalide, which comprises contacting an aqueous solution of a halogen having an atomic number in the range of 35 to 54 with an amalgam containing an alkali metal and subjecting the halogen solution to a galvanic action between the amalgam and a carbon electrode.

3. A process for the preparation of potassium halide substantially free of potassium oxyhalide, which comprises dissolving a halogen having an atomic number in the range of 35 to 54 in an aqueous potassium halide solution of the halogen to be dissolved, and contacting the halogen-containing solution with an amalgam containing potassium.

4. A process according to claim 5 wherein the halogen is iodine.

5. A process for the preparation of sodium halide substantially free of sodium oxyhalide, which comprises dissolving a halogen having an atomic number in the range of 35 to 54 in an aqueous sodium halide solution of the halogen to be dissolved, and contacting the halogen-containing solution with an amalgam containing sodium.

6. A process according to claim 5 wherein the halogen is iodine.

7. A process for the preparation of potassium halide substantially free of potassium oxyhalide, which comprises dissolving a halogen having an atomic number in the range of 35 to 54 in an aqueous potassium halide solution of the halogen to be dissolved, contacting the halogen-containing solution with an amalgam containing potassium, and subjecting the halogen containing solution to the galvanic action resulting between the amalgam and a carbon electrode in the halogen-containing solution.

8. A process according to claim 7 wherein the halogen is iodine.

9. A process for the preparation of sodium halide substantially free of sodium oxyhalide, which comprises dissolving a halogen having an atomic number in the range of 35 to 54 in an aqueous sodium halide solution of the halogen to be dissolved, contacting the halogen-containing solution with an amalgam containing sodium, and subjecting the halogen-containing solution to the galvanic action between the amalgam and a carbon electrode in the halogen-containing solution.

10. A process according to claim 9 wherein the halogen is iodine.

11. A process for the preparation of lithium halide substantially free of lithium oxyhalide, which comprises dissolving a halogen having an atomic number in the range of 35 to 54 in an aqueous lithium halide solution of the halogen to be dissolved, contacting the halogen-containing solution with an amalgam containing lithium, and subjecting the halogen containing solution to the galvanic action between the amalgam and a carbon electrode in the halogen-containing solution.

12. A process according to claim 11 wherein the halogen is iodine.

References Cited in the file of this patent

UNITED STATES PATENTS

| | | |
|---|---|---|
| 738,094 | Brichaux | Sept. 1, 1903 |
| 809,089 | Blackmore | Jan. 2, 1906 |
| 1,570,467 | Ewan | Jan. 19, 1926 |
| 2,104,679 | Sorensen | Jan. 4, 1938 |
| 2,227,547 | Lanzetti | Jan. 7, 1941 |
| 2,316,685 | Gardiner | Apr. 13, 1943 |